March 25, 1969 R. MALLEBREIN 3,435,281
ELECTRON BEAM DEFLECTION CIRCUITS
Filed Aug. 26, 1966 Sheet 1 of 2

*INVENTOR*
Rainer Mallebrein

*BY* Spencer & Kaye
*ATTORNEYS*

INVENTOR
Rainer Mallebrein
BY Spencer & Kaye
ATTORNEYS 3,435,281

ELECTRON BEAM DEFLECTION CIRCUITS

Rainer Mallebrein, Constance, Germany, assignor to Telefunken Patentverwertungsgesellschaft m.b.H., Ulm (Danube), Germany Filed Aug. 26, 1966, Ser. No. 575,292
Claims priority, application Germany, Aug. 28, 1965, T 29,296
Int. Cl. H01j *29/70, 29/74*
U.S. Cl. 315—27 11 Claims

ABSTRACT OF THE DISCLOSURE

In an electron beam deflection circuit for causing the periodic deflection and rapid retrace of an electron beam, a circuit arrangement for permitting information to be written on the associated picture tube face, which arrangement includes a linear amplifier and an auxiliary circuit connected with the deflection circuit coil for producing, in cooperation with the coil, a compensation of the retrace voltages at the output of the amplifier, and means electrically connected in the circuit for selectively disconnecting the auxiliary circuit. The auxiliary circuit includes at least one capacitor, and one line switch and one booster diode connected to the capacitor for effectively isolating the linear amplifier from the high retrace voltages appearing across the deflection coil.

Figure 1:
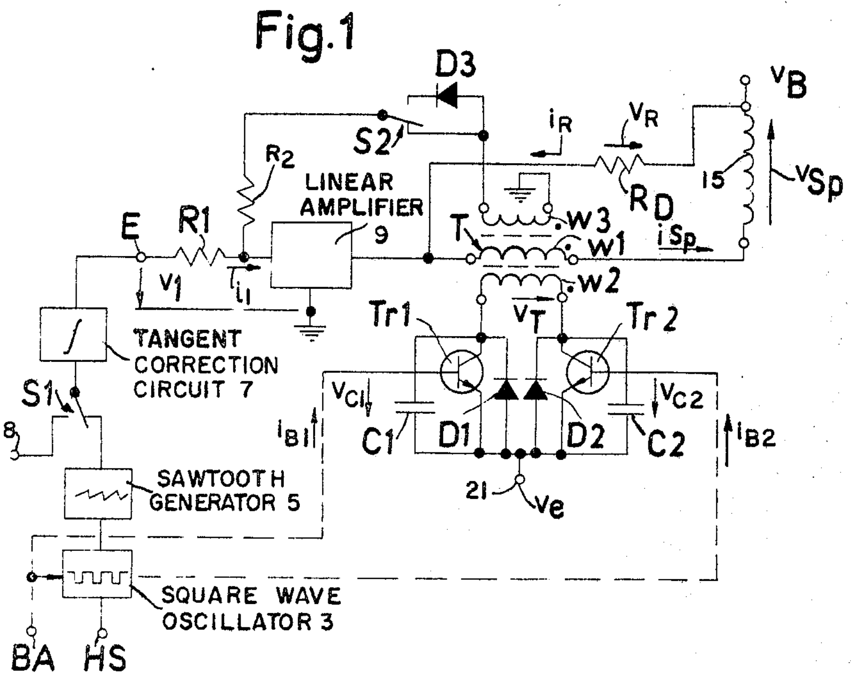

The present invention relates to electric circuits, and particularly to electron beam deflection circuits of the type employed in radar and television receivers.

It is known that the production of television pictures is accomplished by scanning the face of a picture tube with an electron beam, the scanning being effected by causing the beam to trace a plurality of parallel, substantially horizontal lines across the picture tube face. All of the lines are traced in the same direction and at the end of each line the electron beam is caused to return to the edge, of the picture tube face from which the lines are to begin. The time interval, which is also known as the retrace or blanking interval, required for returning the beam to the starting edge of the picture tube face must be relatively short with respect to the time required for tracing each scanning line. The signal waveform required for producing a constant velocity scanning and a rapid retrace is usually created by energy-regenerating non-linear circuits, or line switches.

One of the disadvantages associated with such circuits resides in the fact that it is impossible to effect a precise control of the variations of the beam deflection current as a function of time. In order to overcome this disadvantage, non-linear elements are generally provided in the deflection circuit in order to correct for deviations of this characteristic from the desired value. When large deflection angles are required, a sinusoidal component is frequently superimposed on the sawtooth current waveform in order to correct for tangent errors.

It is also known to produce radar displays of the type having an image representation similar to that of a television picture by means of a standard converter in order to increase the brightness of the radar display. For this purpose, a linear circuit, or class A amplifier, is preferably used for producing the line deflections. Such a circuit may be used for producing accurate television picture representations or for reproducing radar pictures employing radial scanning lines. With such an arrangement, it is possible to make the coil current precisely proportional to a control voltage.

However, one of the disadvantages presented by such a linear circuit is that it has an associated power loss which increases in proportion to the deflection speed. Since the deflection power required for television and radar sawtooth deflections reaches undesirably high values during retrace, it is often practically impossible, if not completely so, to fabricate deflection amplifiers having the required characteristics. Even if such amplifiers could be produced, they would have to be constructed to have power handling capabilities which are far beyond those required during the line tracing portions of the electron beam deflection cycle.

In the presentation of radar displays in particular it is often desired to fade additional information, such as alphanumeric characters or vectors for example, into the picture under the control of some additional information source, such as an electronic computer for example. When such a procedure is followed, it is preferable that this additional information not be added to the display by means of a line scanning pattern, but rather by special deflection methods, which are known per se, for producing characters on a screen by causing an electron beam to act as an electron "pencil" which writes the individual characters at required points on the screen. For this purpose, the beam deflection amplifiers must be capable of producing any desired type of periodic writing signals.

It is a primary object of the present invention to provide improved beam deflection circuits.

A more specific object of the present invention is to provide improved deflection circuits for creating line-by-line deflections of an electron beam in order to produce television-type scanning lines or radial radar display lines, while eliminating the disadvantages noted above in connection with existing circuits and resulting from the required short retrace time intervals.

A further object of the present invention is to provide an improved circuit which is capable of producing scanning lines and of carrying out the character writing functions during certain portions of its operating cycle, for example during the vertical retrace intervals between the successive fields produced when interlace scanning is employed.

A further object of the present invention is to permit such scanning to be controlled by linear amplifiers having reduced power handling requirements.

These and other objects according to the present invention are achieved by the provision, in a beam-deflection circuit having a deflection coil and deflection means for applying a current waveform of the sawtooth type to the coil for causing the periodic deflection of an electron beam, of the combination including a linear amplifier and an auxiliary circuit, both connected with the coil in the deflection circuit for producing, in cooperation with the coil, a compensation of the retrace voltages at the output of the amplifier, the combination further including pulse producing means for selectively disconnecting the auxiliary circuit.

In further accordance with the present invention, the amplifier is controlled during the retrace intervals by a voltage which is substantially proportional to the coil retrace current so as to maintain the amplifier output voltage at a low value.

Additional objects and advantages of the present invention will become apparent upon consideration of the following description when taken in conjunction with the accompanying drawings in which:

FIGURE 1 is a circuit diagram showing one preferred embodiment of the present invention.

FIGURES 2*a*, 2*b*, 2*c*, 2*d*, 2*e*, 2*f*, 2*g*, 2*h* and 2*i* are waveform diagrams used in explaining the operation of the embodiment of FIGURE 1.

Figure 3:
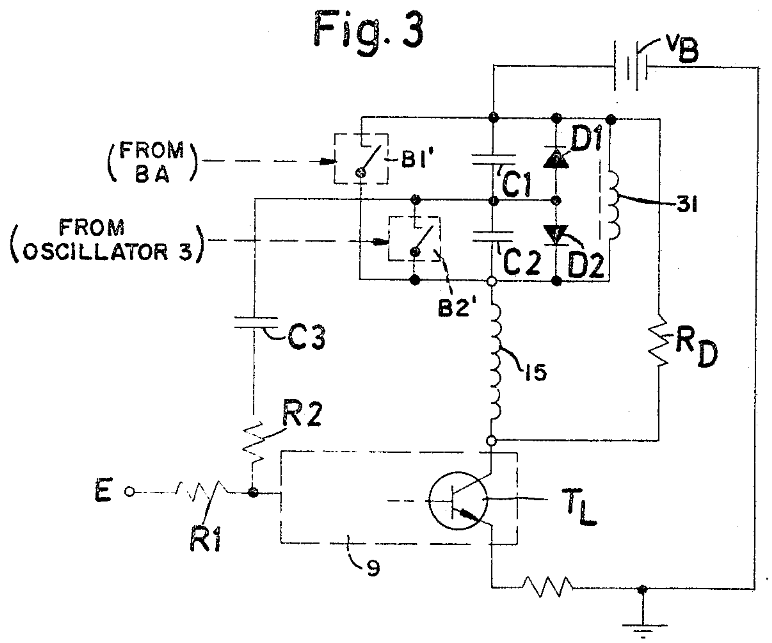

FIGURE 3 is a circuit diagram of a modified version of the arrangement of FIGURE 1.

FIGURE 1 shows a circuit diagram of a horizontal sweep circuit according to the present invention which includes a horizontal sweep frequency square wave pulse oscillator 3 whose output frequency is precisely controlled by horizontal synchronizing signals HS applied thereto. The output from oscillator 3 is applied to control the frequency of the sawtooth wave produced by a sawtooth wave generator 5 whose output is supplied to a tangent correction circuit 7 by way of an electronic switch S1. The output voltage V1 from tangent correction circuit 7 is applied to the input terminal E of the deflection amplifier circuit. This voltage is applied through a resistor R1 to the input of a linear amplifier 9 forming a part of the amplifier circuit.

Electric switch S1 can be selectively switched to apply to the input of tangent correction circuit 7 the signals appearing at an input terminal 8 rather than the output of generator 5. This terminal may be connected to a suitable digital-analog converter which supplies character information voltages, which may be in the form of positioning voltages and additional character-forming voltages, supplied by an electronic computer, for example.

The output from amplifier 9 produces a horizontal deflection signal for the horizontal deflection coil 15 and is connected to one end of this coil by way of a winding *w*1 of a transformer T. The other end of deflection coil 15 is connected to the amplifier output by way of a damping resistor $R_D$ which is thus connected in parallel with the series arrangement of coil 15 and winding *w*1.

Transformer T forms a part of an auxiliary compensating circuit and is further provided with a second winding *w*2 having one end connected to one side of a capacitor C1 and the other end connected to one side of a capacitor C2, both capacitors also forming a part of the auxiliary circuit. The other sides of each of these capacitors are connected together at a common junction. Each of the capacitors C1 and C2 is connected across the collector-emitter circuit of a respective one of the switching transistors T*r*1 and T*r*2 and in parallel with a respective one of the diodes D1 and D2 of the auxiliary circuit.

The common junction at which the capacitors C1 and C2 are connected together, and at which the emitters of transistors T*r*1 and T*r*2 and the plates of diodes D1 and D2 are connected, is also connected to a terminal 21 to which the emitter supply voltage $V_e$ for the transistors is applied. The values of capacitors C1 and C2 are chosen so that capacitor C1 has a larger capacitance than the capacitor C2.

Transformer T is also provided with a third winding *w*3 one end of which is connected to ground and the other end of which is connected to the input of amplifier 9 by way of a feedback path constituted by a switch S2 a diode D3 and a resistor R2. Switch S2 is arranged to selectively connect the winding *w*3 to resistor R2 either directly or through the intermediary of diode D3. The feedback circuit is provided to cause the output across winding *w*3 to be combined with the voltage supplied through resistor R1 at the input of amplifier 9.

When sawtooth voltages having a relatively steep trailing edge, which corresponds to a rapid retrace time, are provided at the input E by generator 5, the circuit of FIGURE 1 provides a compensation for the retrace voltages across deflection coil 15 so as to effectively isolate amplifier 9 from this high voltage.

The base of transistor T*r*1 is provided with an input via terminal BA and the base of transistor T*r*2 is provided with a control input derived from the square-wave generator 3.

A source of D.C. operating voltage $V_B$ is connected to one end of coil 15.

The operation of this device may be best understood by considering the waveforms shown in FIGURES 2*a* to 2*i*. When the switch S1 is in the position shown, the sawtooth voltage supplied at terminal E has the form shown in the portion of FIGURE 2*a* extending between the instants $t_o$ and $t_z$. The exact shape of the gradually sloping part of each sawtooth wave is controlled by the tangent correction circuit 7.

Figures 2A, 2B, 2C, 2D, 2E, 2F, 2G, 2H, 2I:
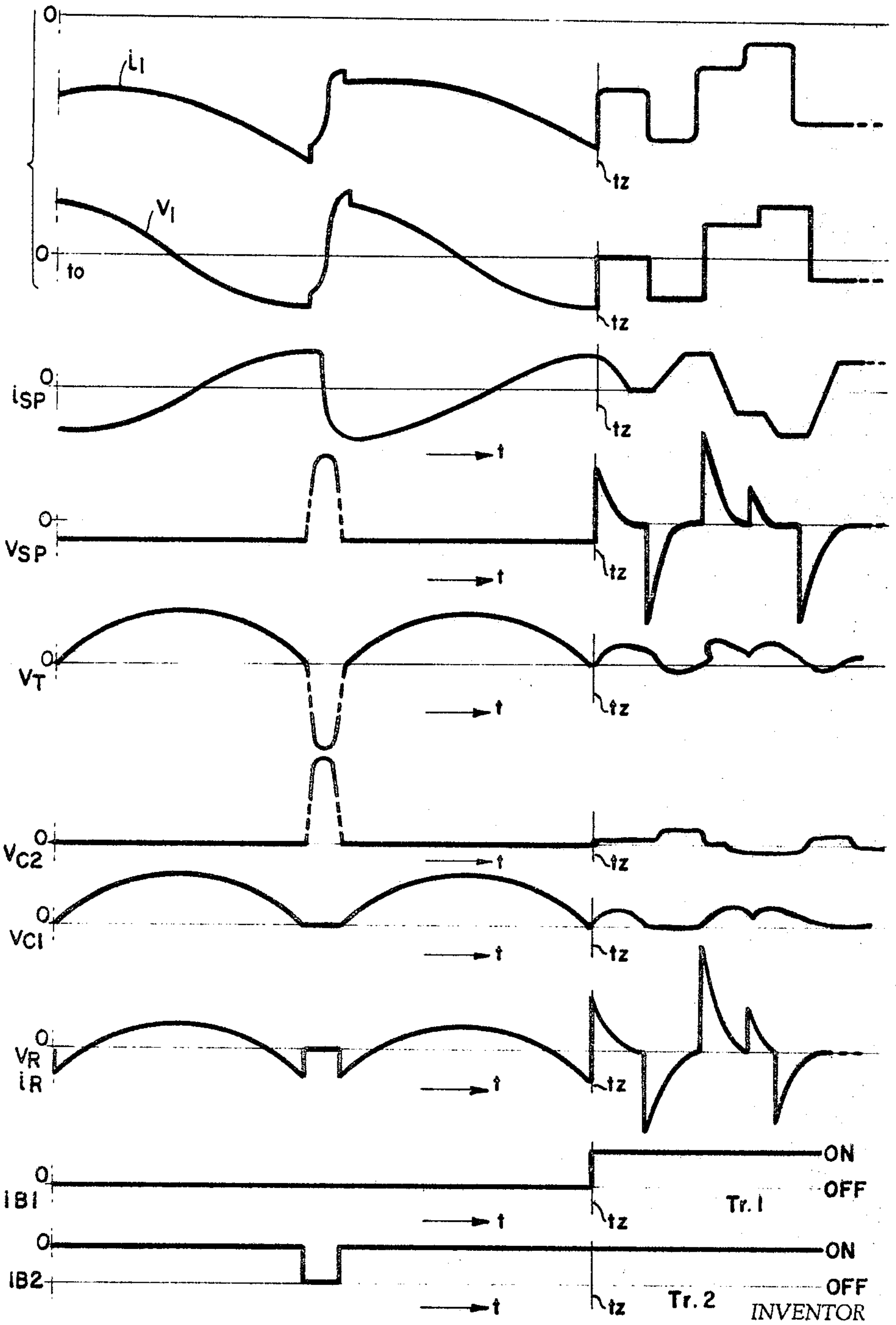

As is shown in FIGURE 2*h*, terminal BA operates to supply a current *i*B1 which maintains transistor T*r*1 cut off for as long as a sawtooth voltage is being supplied to input E. At the same time, the base current *i*B2, which is shown in FIGURE 2*i*, is controlled by the voltage waveform of square wave oscillator 3 to cut off transistor T*r*2 only during the retrace intervals of the sawtooth voltage. Since the transistor T*r*2 is in a conducting state during the forward beam deflection intervals, the capacitor C2 is effectively short circuited during those periods. However, because the transistor T*r*1 is cut off until the instant $t_z$, the voltage $V_{C1}$ across capacitor C1 has the waveform shown in FIGURE 2*f* and rises parabolically during the passage of the deflection coil current *iSp* from a maximum negative value to zero and then decreases parabolically as the deflection coil current increases from zero to its maximum positive value. The waveform of the current *iSp* is shown in FIGURE 2*b*. The capacitor C1 is given a value such that its charge returns to a value of zero just as the deflection current through coil 15 reaches its maximum positive value. The voltage across capacitor C1 is maintained at a value of zero during each retrace interval by diode D1.

During each interval when the coil 15 is producing a scanning line, an erorr in the linearity of the deflection circuit waveform is produced due to the fact that the capacitor C1 of the auxiliary circuit is inductively coupled into the deflection circuit through transformer T and thus causes the transformer voltage $V_T$ to have a parabolic component, as is shown in FIGURE 2*d*, which is applied across damping resistor $R_D$. The voltage and current waveform appearing across damping resistor $R_D$ is shown in FIGURE 2*g*. In order to compensate for the parabolic component a voltage having a similar waveform is fed back to the input of amplifier 9 from transformer winding *w*3 through the intermediary of resistor R2. Switch S2 is operated during each picture scanning interval to place diode D3 in this feedback path in order to isolate the amplifier input from the high retrace voltage pulses induced in winding *w*3.

The input current $i_i$ to amplifier 9, which is a resultant of the combination of voltage V1 and the feedback voltage across resistor R2, is shown in FIGURE 2*a* (1).

Transistor T*r*2 is rendered non-conductive, thereby removing the short circuit from across capacitor C2, only during the retrace intervals of the deflection current supplied to coil 15. As is shown in FIGURE 2*a*, the sawtooth generator 5 is arranged to produce a waveform whose retrace portions have a cosinusoidal configuration. As a result, a voltage having the shape of a sinusoidal halfwave is induced in capacitor C2 during each retrace interval, as is shown in FIGURE 2*e*. This waveform compensates, via transformer T (see waveform $V_T$ in FIG. 2*d*), the high retrace voltage across deflection coil 15, as shown in FIG. 2*c*. FIG. 2*g* shows the resulting voltage across coil 15 and transformer T, or across damping resistor $R_D$. Since capacitor C1 has a larger capacitance in comparison with capacitor C2, the action of the auxiliary circuit during the retrace intervals does not differ in principle from the usual horizontal deflection of the television receiver having a capacitor in the deflection circuit, a line switch, and an interception, or "booster" diode across the capacitor. The diodes D1 and D2 perform a corresponding function, with diode D2 preventing a voltage from appearing across capacitor C2 during the forward beam deflection intervals.

The above-described retrace voltage control of the amplifier 9 causes its output voltage to be low since the input voltage to the amplifier corresponds to current through the deflection circuit during retrace. This means that the relatively high retrace voltage across the deflection coil 15, the voltage $V_{Sp}$ across the coil being shown in FIGURE 2*c*, does not appear at the amplifier output, but is compensated by the auxiliary circuit composed of transistors T*r*1 and T*r*2, diodes D1 and D2, and capacitors C1 and C2.

The transformer winding *w*2 acts as a choke in the circuit containing the two capacitors C1 and C2 and serves to maintain the proper D.C. operating point for the amplifier 9. The capacitor C1 acts to reverse, during each forward beam deflection interval, the polarity of the energy previously stored in this choke during the preceding retrace interval.

When it is desired to fade alphanumeric characters into the television or radar display, this can be accomplished during the vertical retrace interval following the scanning of each picture field, and being accompanied by a rectangular "vertical blanking" pulse, as known per se. The start of one such retrace interval is indicated by the instant $t_z$ in FIGURE 2.

As may be seen from FIGURES 2*f* and 2*g*, both capacitors C1 and C2 are completely discharged at the instant $t_z$ and can be short circuited by rendering the transistor T*r*1 conducting at that instant, as is shown in FIGURE 2*h*, after which both transistors are maintained in a conducting state during the entire character writing interval. As a result, the entire auxiliary circuit is rendered ineffective during each such interval.

Simultaneously with the short circuiting of both capacitors, the terminal 8 is connected by means of switch S1 to the amplifier input E through the circuit 7 for supplying the necessary horizontal character positioning voltage components and, as the case may be, additional character-writing voltage components. Such voltages are shown in the portion of FIGURE 2*a* to the right of the line representing instant $t_z$ and may have the generally rectangular form shown. The resulting deflection coil current and voltage waveforms are shown in the corresponding portions of FIGURES 2*b* and 2*c*, respectively. Since the transistors T*r*1 and T*r*2 and the diodes D1 and D2 are affected to some extent by voltages induced in transformer T, and thus do not present a complete short circuit, small residual voltages exist in the auxiliary circuit and have the general form shown in the corresponding portions of FIGURES 2*d*, 2*e*, and 2*f*. These voltages cause some disturbances in the waveform of the deflection current *iSp*, and hence result in a deflection error. However, the feedback from winding *w*3 to the amplifier input, which feedback is carried out with switch S2 in the position shown so as to remove diode D3 from the feedback loop provides a compensation for these disturbances.

In order to automatically disconnect the auxiliary circuit by rendering both transistors T*r*1 and T*r*2 conductive during the intervals between successive scanning fields for fading the characters into the picture area during these intervals, a control signal is applied at the terminal BA, producing the stepwise increase in current *ib*1 at the time $t_z$ as shown in FIG. 2*h*. This control signal may be taken from the received signal and may be constituted by the rectangular, vertical blanking pulse appearing between each successive pair of picture scanning fields. This signal is also applied to oscillator 3 to prevent it from rendering transistor T*r*2 non-conductive during these vertical blanking intervals.

In addition, connections should be provided for permitting external signals, such as from an electronic computer for example, to produce selective disconnections and connections of the auxiliary circuit.

In accordance with a modified form of construction of the present invention, the capacitors C1 and C2 need not be connected in the deflection circuit through the intermediary of a transformer, but rather may be connected directly in series in this circuit, as is shown in FIGURE 3. When such an arrangement is employed, a separate choke coil 31 must be provided across the series arrangement of capacitors C1 and C2.

The circuit of FIGURE 3 also differs from that of FIGURE 1 in that a somewhat different switching arrangement is employed for controlling capacitors C1 and C2. Capacitor C2 is connected in parallel with a line switch B2′ which is controlled by square wave oscillator 3 in such a manner as to cause capacitor C2 to be effectively in the deflection circuit only during the horizontal retrace intervals. Another switch B1′ is connected across the series arrangement of capacitors C1 and C2 for effectively eliminating both capacitors from the deflection circuit when this switch is closed, this occurring during the above-described character writing intervals.

Also in this embodiment, the feedback to amplifier 9 is taken from a junction between the two capacitors C1 and C2 and is fed through a third capacitor C3 which isolates the input of amplifier 9 from the D.C. operating voltage source $V_B$. Amplifier 9 is here shown as a transistor amplifier having a power amplifier $T_L$ as its output stage.

It will be understood that the above description of the present invention is susceptible to various modifications, changes, and adaptations, and the same are intended to be comprehended within the meaning and range of equivalents of the appended claims.

What is claimed is:

1. In an electron beam deflection circuit having a deflection coil and deflection means for applying a current waveform of the sawtooth type to said coil for causing the periodic deflection and rapid retrace of an electron beam, the combination comprising a linear amplifier and an auxiliary circuit, both connected with said coil in said deflection circuit for producing, in cooperation with said coil, a compensation of the retrace voltages at the output of said amplifier, and pulse producing means electrically connected for selectively disconnecting said auxiliary circuit.

2. An arrangement as defined in claim 1 wherein said beam deflection circuit is arranged to apply to said amplifier an input voltage which, during the deflection coil retrace periods, is substantially proportional to the deflection coil retrace current so as to maintain the output voltage from said amplifier at a low value.

3. An arrangement as defined in claim 1 wherein said auxiliary circuit is arranged to be effectively disconnected at the end of each period corresponding to the scanning of one picture field.

4. An arrangement as defined in claim 1 wherein said auxiliary circuit is arranged to be effectively disconnected during some portion of each period during which said beam deflection circuit causes one picture frame to be scanned.

5. An arrangement as defined in claim 1 further comprising means for supplying an information-writing voltage to the input of said amplifier during periods when said auxiliary circuit is disconnected.

6. In an electron beam deflection circuit having a deflection coil and deflection means for auplying a current waveform of the sawtooth type to said coil for causing the periodic deflection and rapid retrace of an electron beam, the combination comprising a linear amplifier and an auxiliary circuit, both connected with said coil in said deflection circuit for producing, in cooperation with said coil, a compensation of the retrace voltages at the output of said amplifier, said auxiliary circuit including: at least one capacitor; one line switch and one booster diode connected to said capacitor for producing, in combination with said deflection coil, a compensating voltage; and a choke inductance connected across said capacitor for maintaining the desired D.C. operating point of said amplifier.

7. An arrangement as defined in claim 6 wherein said auxiliary circuit further comprises a second capacitor having a larger capacitance than said first capacitor and connected for reversing the polarity of the energy stored in said inductance during each retrace period, the capacitance of said second capacitor having a value such that it completes such energy polarity reversal at least at the end of each period corresponding to the scanning of one picture field.

8. An arrangement as defined in claim 6 wherein said auxiliary circuit further comprises a feedback circuit for delivering said compensating voltage to the input of said amplifier.

9. In an electron beam deflection circuit having a deflection coil and deflection means for applying a current waveform of the sawtooth type to said coil for causing the periodic deflection and rapid retrace of an electron beam, the combination comprising a linear amplifier and an auxiliary circuit, both connected with said coil in said deflection circuit for producing, in cooperation with said coil, a compensation of the retrace voltages at the output of said amplifier, said auxiliary circuit including: a transformer having a first winding connected in series with said deflection coil, a second winding and a third winding; two capacitors connected in series across said second winding; switch means connected across each of said capacitors for selectively short-circuiting each said capacitor individually; and feedback means connected to said third winding for applying the voltage thereacross to the input of said amplifier.

10. An arrangement as defined in claim 9 wherein said beam deflection circuit comprises: square wave oscillator means for producing a wave train having a repetition rate equal to the rate at which said beam deflection circuit is to produce horizontal scanning lines; a sawtooth wave generator driven by said oscillator for producing a sawtooth wave train each cycle of which has a shallow leading edge and a steep trailing edge, and a tangent correction circuit having an input connected to the output of said sawtooth generator and an output connected to the input of said linear amplifier.

11. An arrangement as defined in claim 9 further comprising switch control means for short-circuiting both of said capacitors at the end of each period of operation of said deflection circuit corresponding to the scanning of one picture frame.

References Cited

UNITED STATES PATENTS 3,219,875 11/1965 Craven -------------- 315—27

RODNEY D. BENNETT, *Primary Examiner.*

CHARLES L. WHITMAN, *Assistant Examiner.*